United States Patent
Ozawa

(10) Patent No.: US 6,853,512 B2
(45) Date of Patent: Feb. 8, 2005

(54) DATA STORAGE DEVICE, HEAD POSITIONING APPARATUS AND HEAD POSITIONING METHOD

(75) Inventor: Yutaka Ozawa, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 10/251,329

(22) Filed: Sep. 20, 2002

(65) Prior Publication Data

US 2003/0067708 A1 Apr. 10, 2003

(30) Foreign Application Priority Data

Sep. 21, 2001 (JP) ........................................ 2001-289307

(51) Int. Cl.[7] ............................................. G11B 5/596
(52) U.S. Cl. .................. 360/77.02; 360/75; 360/77.08; 318/561; 318/619
(58) Field of Search ................................ 360/77.02, 75, 360/77.04, 77.08; 318/560, 561, 608, 609, 610, 611, 615, 619, 634, 636

(56) References Cited

U.S. PATENT DOCUMENTS

| | | | | |
|---|---|---|---|---|
| 5,550,685 A | * | 8/1996 | Drouin | 360/77.08 |
| 5,610,487 A | * | 3/1997 | Hutsell | 360/77.08 |
| 6,219,196 B1 | * | 4/2001 | Semba et al. | 360/75 |
| 6,246,536 B1 | * | 6/2001 | Galloway | 360/78.04 |
| 6,417,982 B1 | * | 7/2002 | Ottesen et al. | 360/77.02 |
| 6,574,065 B1 | * | 6/2003 | Sri-Jayantha et al. | 360/75 |

FOREIGN PATENT DOCUMENTS

JP    03173217 A   *   7/1991

* cited by examiner

*Primary Examiner*—Sinh Tran
*Assistant Examiner*—James L Habermehl
(74) *Attorney, Agent, or Firm*—Ronald B. Feece

(57) ABSTRACT

A data storage device that can perform a track following process even when vibrations are produced by a wide range of frequencies.

15 Claims, 12 Drawing Sheets

$$u(n) = K1*y(n) + K2*[y(n)-y(n-1)] + K3*u(n-1) + K4*u(n-2)$$

PES: Position Error Signal   A deviation of a magnetic head from the center of a track $\phi$ (Z) : The phase of a signal output immediately before by a digital peak filter $\phi$ (PES) : The phase of a position error signal

DATA STORAGE DEVICE, HEAD POSITIONING APPARATUS AND HEAD POSITIONING METHOD

BACKGROUND OF THE INVENTION

1. Field of the Invention

The present invention relates to a data storage device such as a hard disk drive, and in particular to an apparatus and a method for positioning a head at a target position.

2. Background Art

A hard disk drive has magnetic heads for reading data from a magnetic disk, or for writing data thereto. These magnetic heads are mounted on an actuator mechanism that is driven by a VCM (Voice Coil Motor). When a magnetic head reads or writes data, the actuator mechanism is driven and moves and positions the magnetic head above a predetermined track. For the moving and the positioning of the magnetic head at a predetermined location, servo data recorded on the magnetic disk is employed.

On a magnetic disk, such as one in a hard disk drive, multiple data tracks are concentrically formed, and identification data and a burst pattern are stored in advance in the direction of the diameter of the disk. The identification data represents the track addresses of the data tracks, and based on the identification data read by a magnetic head, the rough position of the magnetic head, i.e., the position of a magnetic head relative to a data track, can be determined. A burst pattern includes multiple burst pattern arrays wherein signal storage areas, the phases of which differ, are arranged at predetermined intervals in the direction of the diameter of the disk. A signal output by a magnetic head in accordance with a burst pattern can be employed to detect even a slight position shift of the magnetic head, i.e., a deviation wherein the position of the magnetic head is shifted away from a data track relative to the magnetic head.

To read data from or write data to a magnetic disk, first, while the magnetic disk is rotating, identification data read from the magnetic head is employed to determine the rough position of the magnetic head, and the magnetic head is driven to move it to a specific data track. Then, a signal output by the magnetic head in accordance with the burst pattern is employed to precisely position the magnetic head relative to the specific data track. Finally, data can be read from or written to the magnetic disk. This process sequence is called a seek mode. Further, the feedback control is performed so that even during the reading or writing of data, based on a signal that is output by the magnetic head in accordance with the burst pattern, the magnetic head can be positioned at a constant location relative to a specific data track. This operation is called a following mode.

In a hard disk drive, a magnetic disk is so provided that it encircles the outer circumference of a spindle that is rotated by a motor. However, due to manufacturing errors, the center of such a magnetic disk tends to be slightly eccentric relative to the rotational center of the spindle. This eccentricity can serve as a feedback control system disturbance that governs the positioning of the magnetic head at a constant location relative to a specific data track.

Specifically, the feedback control system defines, as a feedback element, a signal that is output by the magnetic head in accordance with the burst pattern, and employs the position of the magnetic head relative to a data track, which is obtained from this signal, and a deviation signal, which represents the deviation from the target position of the magnetic head, to generate and output a control signal that matches the positioning of the magnetic head with the target. In this manner, the feedback control system determines the positioning of the magnetic head. However, even when the positioning of the magnetic head can match the target position, because of the above described eccentricity, a disturbance (a repeatable run out, hereinafter referred to as an RRO) that increases the deviation is added at every predetermined cycle. Therefore, the control by the feedback control system can not follow the RRO, so that conventionally the shifting from the target position of the position of the magnetic head exceeds a permissible value. Accordingly, errors occur repetitively; for example, part of the information read from the data track is lost, or part of the information to be written to the data track can not be written normally.

To resolve these problems, one hard disk drive has been proposed that employs a digital peak filter for obtaining a high gain, i.e., an effective gain, only for an element having a specific, comparatively low frequency (e.g., 60 Hz) that is included in a deviation signal. An input deviation signal is input to the digital peak filter, whereat a control signal is generated, by adding a signal produced by the digital peak filter, and is output. For the hard disk drive, since the specific frequency matches the frequency corresponding to an RRO occurrence cycle, the head can follow the data track without changing the configuration of other sections of the control system.

However, an RRO having a high frequency occurs in a hard disk drive, due not only to the eccentricity of the center of a magnetic disk relative to the rotational center of a spindle, but also because the bearing of the motor that rotates the spindle is not circular. An RRO having a high frequency becomes a problem, especially when the pitches at which data tracks are formed on the magnetic disk are reduced (the distances are smaller) in order to increase the data recording density of the magnetic disk. On the other hand, when for the hard disk drive the frequency for increasing the gain of the digital peak filter is simply increased, the stability of the control system is deteriorated.

Further, for a notebook PC, for example, vibration sources, such as a floppy disk drive, a CD-ROM drive, a cooling fan and a loudspeaker, are internally provided. And in addition, depending on the environment in which the notebook PC is used, external vibrations may be transmitted to the hard disk drive. Thus, it is difficult to designate a frequency for all the vibrations that may be transferred to the hard disk drive. And therefore, while a digital peak filter for a hard disk drive may effectively handle a specific, fixed frequency, it is impossible to suppress the whole range of frequencies which produce vibrations that can be conveyed to the hard disk drive.

SUMMARY OF THE INVENTION

It is one advantage of the present invention that it provides a data storage device that can perform a track following process even when vibrations are produced by a wide range of frequencies. It is another object of the present invention to provide an appropriate head positioning apparatus and head positioning method for such a data storage device.

For the present invention, the performance of a stable track following process that employs the above described digital filter was discussed. To stabilize the track following, a frequency set for the digital peak filter may follow a frequency for a generated vibration or impact. For example, for a magnetic head, a deviation signal that is known as a PES (Position Error Signal) may be analyzed to detect a frequency. Then, only the detected frequency need be employed to appropriately change the frequency set for the digital peak filter. However, since an enormous number of calculations is required to detect a frequency through the analysis of a PES, this method, therefore, this is not a practical resolution means.

The present inventor discovered that for track following an operation using the digital peak filter, an interesting relationship is established between the phase of the PES and the phase of the signal output by the digital peak filter. According to this relationship, when the phase of the PES matches the phase of the signal output by the digital peak filter, the frequency of the PES is slower than the signal output by the digital peak filter, and when these phases are shifted 180°, the frequency of the PES is faster than the signal output by the digital peak filter. This relationship will now be described while referring to FIGS. 10 to 12.

The output (Fout) of the digital peak filter produced by a common Z conversion can be represented by the equation below:

$$\text{Fout} = (KaZ^2 - KbZ)/(Z^2 - 2\cos(\omega \cdot T)Z + 1),$$

wherein Z denotes a signal output immediately before by the digital peak filter, and is called a state variable. Ka and Kb denote gains, and ω and T denote an angular frequency and a set frequency. The waveforms of the state variable Z and the PES are shown in FIGS. 10 to 12.

FIG. 10 is a graph showing an example wherein the frequency of the PES matches the frequency of the state variable Z, i.e., the frequency of the signal output by the digital peak filter. In this case, since the digital peak filter is effective, the PES is suppressed.

FIG. 11 is a graph showing a case wherein the frequency of the PES is slower than the frequency of the signal output by the digital peak filter. It is apparent from this graph that the phase of the PES matches the phase of the signal output by the digital peak filter. FIG. 12 is a graph showing a case wherein the frequency of the PES is faster than the frequency of the signal output by the digital peak filter. In this case, the phase of the PES is shifted 180° from the phase of the signal output by the digital peak filter.

As is described above, when the phases of the PES and the state variable are compared, it can be found that the frequency of the PES is slower or faster than the frequency set for the digital peak filter. Therefore, based on the relationship between the phases of the two signals, the frequency set for the digital peak filter can follow the PES.

Based on the above described idea, according to the present invention, a data storage device comprises: a storage medium for storing user data and servo data; a head for writing and reading the user data at a predetermined access location on the storage medium, and for reading the servo data; signal output means for employing the servo data read by the head to output a position shift signal that represents the distance the position of the head is shifted; a filter for receiving a position shift signal, and for obtaining an effective gain relative to a predetermined frequency that has been set; phase comparison means for comparing the phase of the position shift signal with the phase of a signal output by the filter; frequency setting means for changing the predetermined frequency based on the comparison results obtained by the phase comparison means; control means for, based on the position shift signal and the signal output by the filter, generating a control signal in order to position the head at the access location, and for outputting the control signal; and a motor for driving the head based on the control signal.

According to the data storage device of the invention, since the phase of the position shift signal is compared with the phase of the preceding signal output by the digital peak filter, the relationship of the frequency of the filter output signal to the frequency of the position shift signal can be obtained. That is, comparison results can be introduced indicating that the frequency of the filter output signal is faster or slower than the frequency of the position shift signal. Based on the comparison results, a predetermined frequency for a new signal to be output by the filter is appropriately changed. Of course, this change is made for the purpose of ensuring that the predetermined frequency of the new signal output by the filter follows the frequency of the position shift signal. The change or the following of the predetermined frequency of the filter suppresses the position shift of the head across a wide frequency band.

With this arrangement, it is preferable that the frequency setting means for the data storage device of the invention changes the predetermined frequency so that the predetermined frequency can follow the frequency of the position shift signal.

Further, when the phase of the position shift signal is not substantially shifted away from the phase of the signal output by the filter, the frequency setting means of the data storage device of the invention reduces the predetermined frequency so it is lower than the previously set frequency. And when the phase of the position shift signal is shifted 180° away from the phase of the signal output by the filter, the frequency setting means increases the predetermined frequency so it is higher than the previously set frequency.

The signal (hereinafter referred to as a filter signal) output by the digital peak filter has as a function the attenuation of the vibration of the head. The filter signal having the vibration attenuation function is added to a control current under feedback control. According to the invention, the frequency set for this filter signal is changed as needed. Therefore, in accordance with the present invention, a data storage device comprises: a disk medium on which multiple tracks are formed; a head for performing a seek for the disk medium and for accessing a target track; an actuator for receiving a control current, and for moving and positioning the head above the target track; and a controller for outputting the control current under feedback control, wherein the controller outputs the control current to which a signal is added that has a vibration attenuation function at a predetermined set frequency, and wherein the controller sets the predetermined frequency based on a phase relationship between a signal indicating a deviation of the head relative to the target track, and a preceding signal that has a vibration attenuation function.

For the data storage device of the invention, when there is a predetermined deviation of the head relative to the target track, the controller sets the predetermined frequency based on the phase relationship between the signal indicating the deviation of the head relative to the target track and the preceding signal that has the vibration attenuation function. For this setting, the phase relationship is employed to match or set the predetermined frequency close to the frequency of the signal indicating the deviation of the head relative to the target track.

According to the invention, the following appropriate positioning apparatus is provided for the thus arranged data storage device. According to the present invention, a positioning apparatus for employing an actuator to locate a positioning object at a target position on an access object comprises: signal output means for outputting a deviation signal that indicates a deviation from the target position by the positioning object; control means for, based on a deviation signal output by the signal output means, outputting to the actuator a control signal that ensures the positioning object follows the target position, and for controlling the position of the positioning object; and a digital peak filter for setting a predetermined frequency, or a frequency band including the predetermined frequency, and for filtering the received deviation signal and outputting a signal indicating the filtering results, wherein the control means outputs the control signal with the signal output by the digital peak filter, and wherein the digital peak filter increases or decreases the predetermined frequency of a preceding output signal in accordance with a phase difference between the preceding output signal and the deviation signal, and employs the obtained predetermined frequency to perform filtering.

According to the positioning apparatus of the invention, when the phase difference is substantially 0, the digital peak filter decreases the predetermined frequency of the preceding output signal. And when the phase difference is substantially 180°, the digital peak filter increases the predetermined frequency of the output signal and employs a newly obtained predetermined frequency to perform filtering. For the positioning apparatus of the invention, the access object is a data storage medium on which multiple tracks for the storage of data are concentrically formed, and the positioning object is a head for reading data from a track or for writing data to a track. When a burst pattern is formed on the data storage medium, the signal output means outputs the deviation signal based on the burst pattern read by the head.

According to the invention, the following positioning method is provided for the data storage device and the positioning apparatus described above. The positioning method, for employing a deviation signal that indicates the deviation of a positioning object relative to a target position on a rotary disk to ensure the positioning object follows the target position, comprises the steps of: comparing the phase of the deviation signal, which indicates the deviation of the positioning object from the target position, and the phase of a filtering signal, which is obtained by filtering the deviation signal at a predetermined frequency or in a frequency band including the predetermined frequency; employing the obtained relationship between the phase of the deviation signal and the phase of the filtering signal to increase or decrease the preceding predetermined frequency; and adding a filtering signal at the resultant frequency to a control signal that ensures the positioning object follows the target position.

According to the positioning method of the invention, the relationship is defined by matching or not matching the phases of the deviation signal and the filtering signal. When the phases are not matched, the phase difference is 180°.

According to the present invention, the filtering is performed by a digital peak filter. The positioning method of the invention can be applied for a hard disk drive, and in this case, the disk of the invention is a magnetic disk for the hard disk drive, and the head of the invention corresponds to a magnetic head for reading data from tracks that are concentrically formed on the magnetic disk.

DETAILED DESCRIPTION OF THE PREFERRED EMBODIMENTS

The preferred embodiment of the present invention will now be described in detail by employing a hard disk drive as an example.

Figure 1:
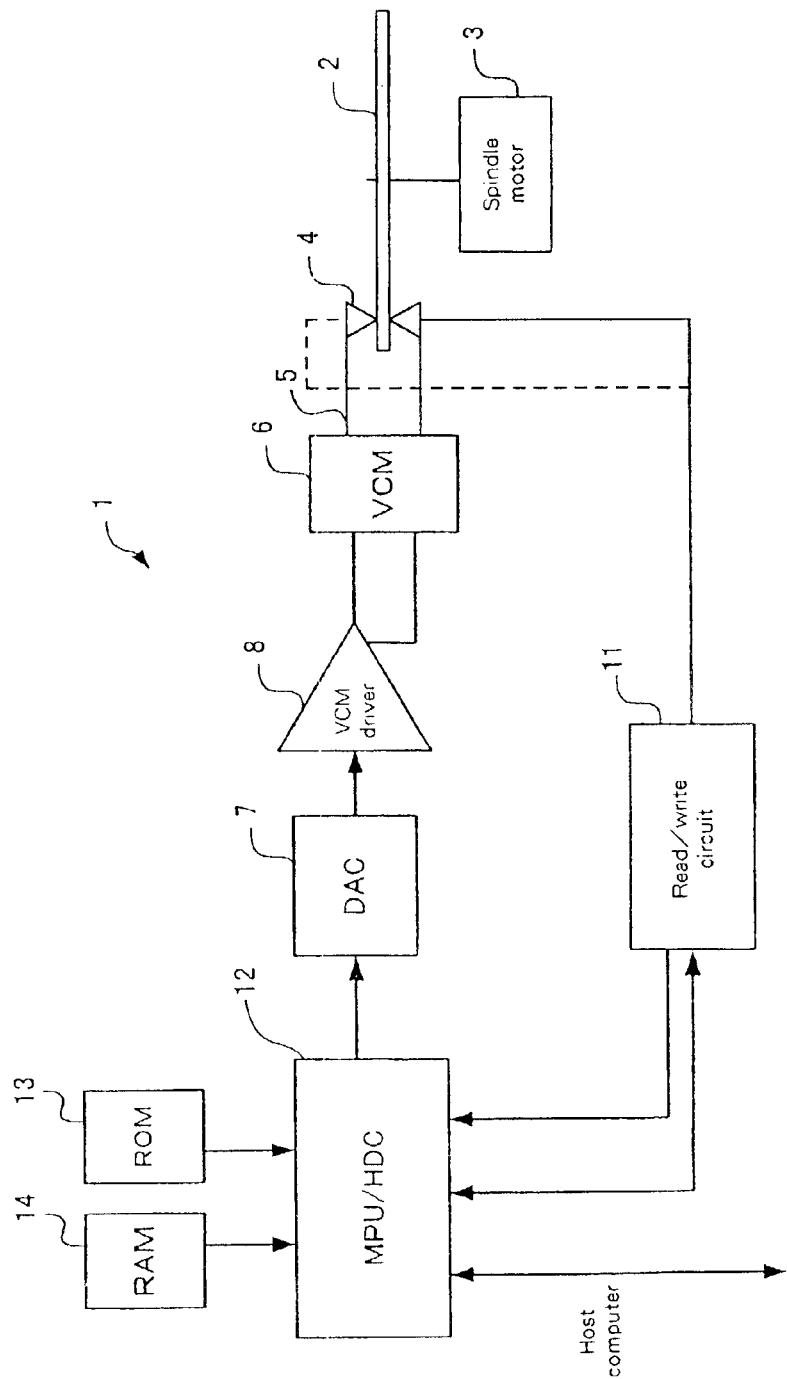
FIG. 1 is a block diagram showing the essential configuration of a hard disk drive according to one embodiment of the present invention.

FIG. 1 is a block diagram showing the essential portion of a hard disk drive 1. The hard disk drive 1 is a data storage/reproduction apparatus wherein a magnetic head 4 performs a seek operation for a magnetic disk 2 that is driven by a spindle motor 3, and remains at a predetermined track (position) to write data to or to read data from the magnetic disk 2. A single or a plurality of magnetic disks 2 can be mounted, as needed, within the hard disk drive 1, but in this embodiment, only one magnetic disk 2 is so employed.

Figure 2:
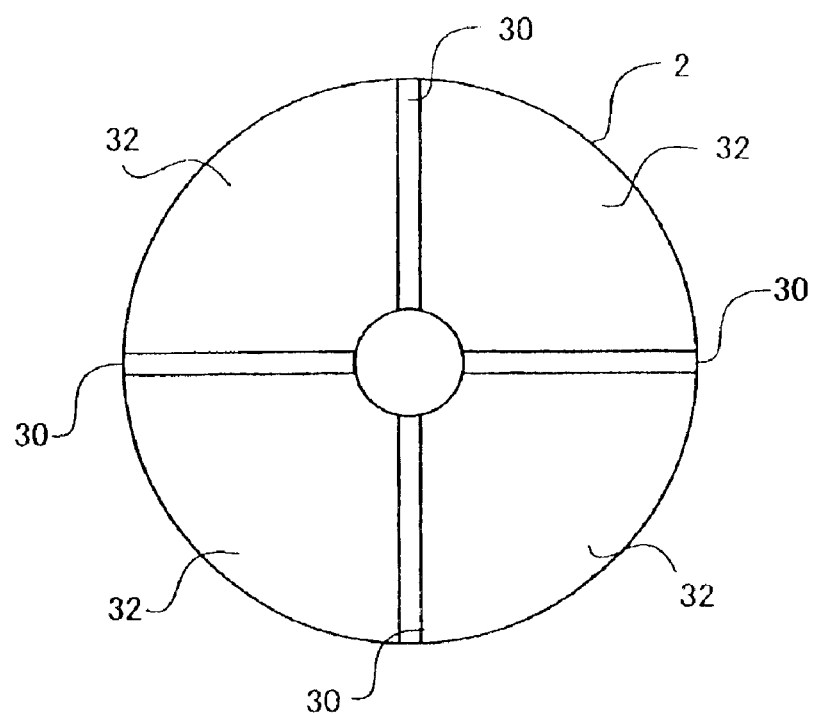
FIG. 2 is a conceptual diagram showing the contents stored on a magnetic disk according to the embodiment.
Figure 3:
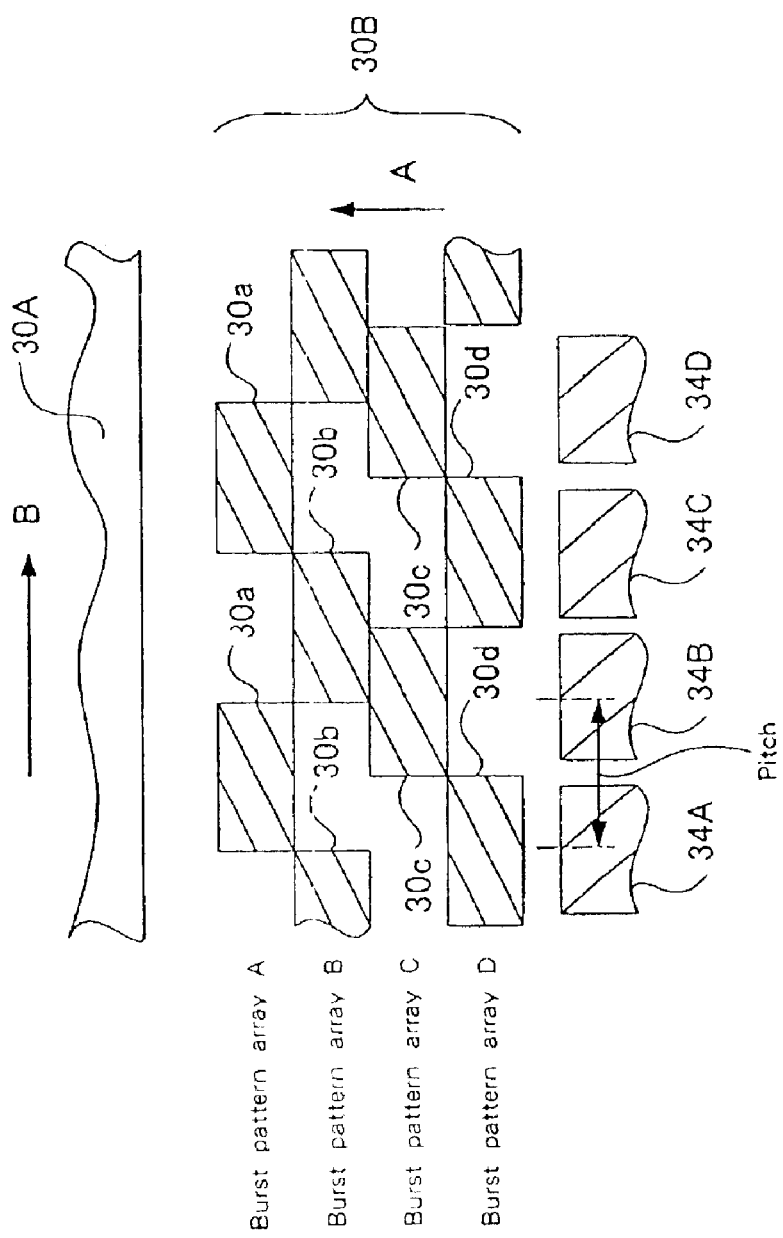
FIG. 3 is a conceptual diagram showing the contents stored on the magnetic disk according to the embodiment.

When the hard disk drive 1 is driven, the magnetic disk 2 is rotated at the spindle shaft of the spindle motor 3, and when the hard disk drive 1 is inactive, the magnetic disk 2 is halted (is stationary). As is shown in FIG. 2, on each recording face of the magnetic disk 2, multiple position detection data storage areas 30 are formed radially in the direction of the diameter of the magnetic disk 2, and the remaining areas are defined as data track areas 32. In FIG. 3, part of the position detection data storage area 30 and the data track area 32 are shown. Multiple data tracks are formed concentrically at set pitches in the data rack area 32, and part of these tracks, i.e., data tracks 34A, 34B, 34C and 34D, are shown in FIG. 2. The magnetic head 4, which will be described later, reads or writes data along each data track 34 in the circumferential direction (direction indicated by an arrow A in FIG. 3) of the magnetic disk 2.

A track identification data storage area 30A and a burst pattern storage area 30B are formed in the position detection data storage area 30. In the track identification data storage area 30A, track identification data, which represents the track address of each data track 34 by using a Gray code (cyclic binary code), is stored in consonance with each data track 34. Further, a burst pattern is formed in the burst pattern storage area 30B. As is shown in FIG. 3, the burst pattern consists of four burst pattern arrays A to D wherein signal storage areas (hatched portions in FIG. 3) are arranged in the direction in which the data tracks 34 are positioned, i.e., in the direction of the diameter of the magnetic disk 2. For the individual signal storage areas constituting each burst pattern array, the size of the signal storage area and the interval between the adjacent areas in the direction of the diameter of the magnetic disk 2 are equal to the pitch P of the data tracks 34.

The signal storage areas 30a of the burst pattern array A, and the signal storage areas 30b of the burst pattern array B are arranged in a zigzag shape in the direction of the diameter of the magnetic disk 2. The sides at both ends of each area in the direction of the disk diameter correspond to the widthwise center portion of a data track 34, and the burst pattern arrays A and B are formed by storing a signal in each area. The signal storage areas 30c of the burst pattern array C and the signal storage areas 30d of the burst pattern array D are also arranged in a zigzag shape in the direction of the diameter of the magnetic disk 2. Further, the sides at both ends of each area in the direction of the disk diameter correspond to boundaries between the data tracks 34, and the burst pattern arrays C and D are formed by storing a signal in each area.

At the distal end of an actuator 5, the magnetic heads 4 are held in consonance with the obverse and reverse faces of the magnetic disk 2. The magnetic head 4 reads data from and writes data to the magnetic disk 2, and also reads servo data from the magnetic disk 2. The magnetic head 4 is moved with the actuator 5 in the radial direction of the magnetic disk 2. A lamp (not shown) is located outside the magnetic disk 2 and is retracted when the magnetic head 4 is not driven.

A read/write circuit 11 performs data reading/writing. That is, write data transferred by a host computer via an MPU/HDC 12 is converted into a write signal (current), and the write signal is transmitted to the magnetic head 4. Based on the write current, the magnetic head 4 writes data to the magnetic disk 2. Further, the magnetic head 4 converts a signal (current) read from the magnetic disk 2 into digital data, and outputs the digital data to a host computer via the MPU/HDC 12. The servo data is also included in the digital data.

The actuator 5 is driven by a voice coil motor (VCM) 6, and it can therefore be said that the VCM 6 drives the magnetic head 4. The VCM 6 is constituted by a movable element having as an element a coil and as an additional element a fixed element having a permanent magnet. When a predetermined current is supplied to the coil by a VCM driver 8, the movable element is driven and the magnetic head 4 is moved to, or halted at, a predetermined position on the magnetic disk 2.

The MPU/HDC 12 determines the position of the magnetic head 4 based on a signal received from the read/write circuit 11, employs the deviation between the determined position of the magnetic head 4 and the target position thereof to generate, in a manner that will be described later, a control signal for controlling the positioning of the magnetic head 4, and outputs the control signal to the DAC 7 connected to the MPU/HDC 12. That is, the control signal is a motor current control signal for controlling a current that flows across the voice coil of the VCM 6. The detailed operation of the MPU/HDC 12 will be described later.

The DAC 7 converts the control current received from the MPU/HDC 12 into an analog signal (voltage signal), and outputs it to a VCM driver 8.
The VCM driver 8 converts the voltage signal received from the DAC 7 into a drive current, and transmits the drive current to the VCM 6. A ROM 13 and a RAM 14 are provided for the hard disk drive 1.

According to the embodiment, three modes are used for the positioning of the magnetic head 4 of the hard disk drive 1: a seek mode, a settling mode and a following mode. In this embodiment, in the following mode, an innovative positioning process is performed for the magnetic head 4.

Figure 5:
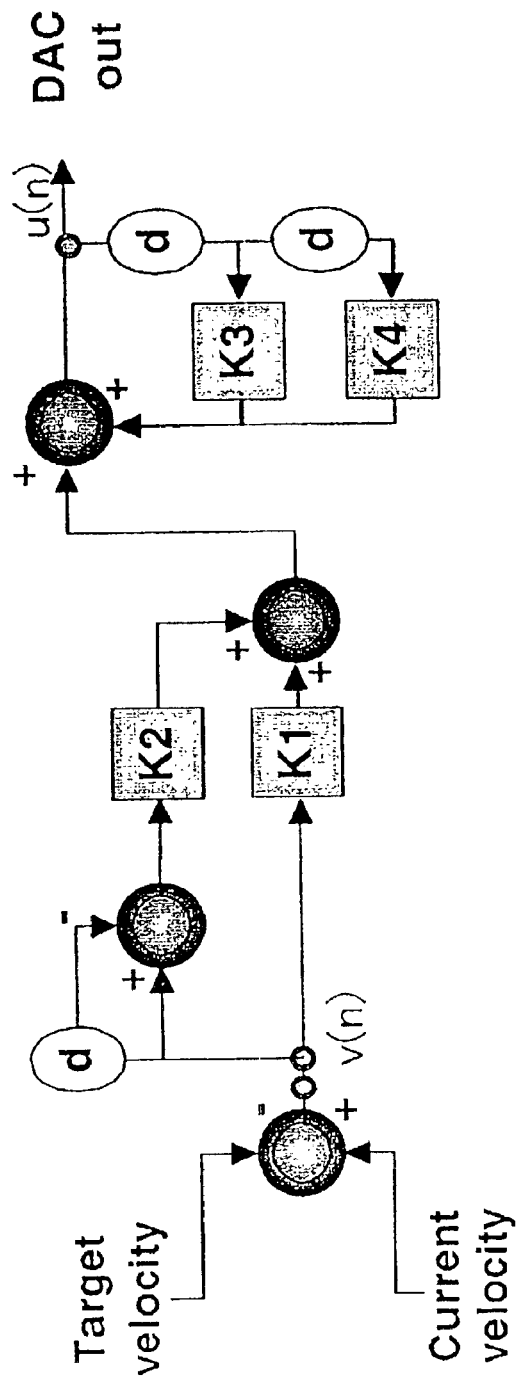
FIG. 5 is a diagram showing the structure for the feedback control in a seek mode.

The configuration for the feedback control in the seek mode is shown in FIG. 5. As is shown in FIG. 5, the seek mode is the feedback velocity control that makes the current velocity of the magnetic head 4 follow the target velocity. In FIG. 5, u(n) indicates a current positioning control (DAC out) that is output to the DAC 7 in the seek mode.

Figure 6:
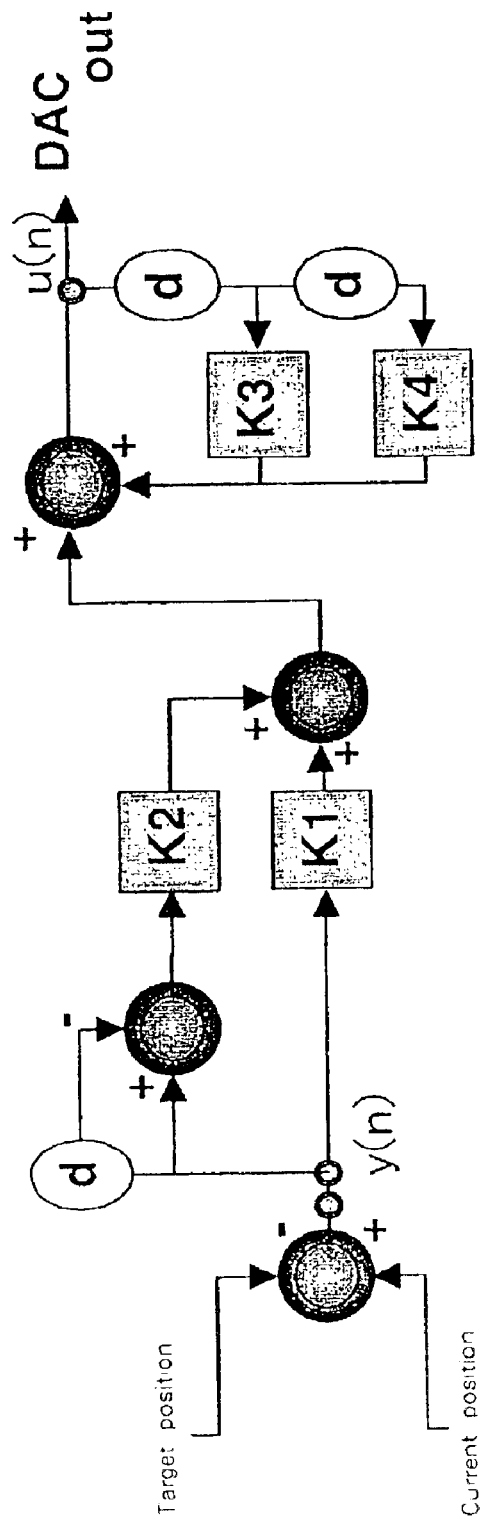
FIG. 6 is a diagram showing the structure for the feedback control in a settling mode.

The structure of the feedback control in the settling mode is shown in FIG. 6. As is shown in FIG. 6, the settling mode provides position-velocity control for the feedback for the distance between the current position of the magnetic head 4 and the target position, and the current velocity. In FIG. 6, u(n) indicates the control current DAC out that is output to the DAC 7 in the settling mode.

Figure 4:
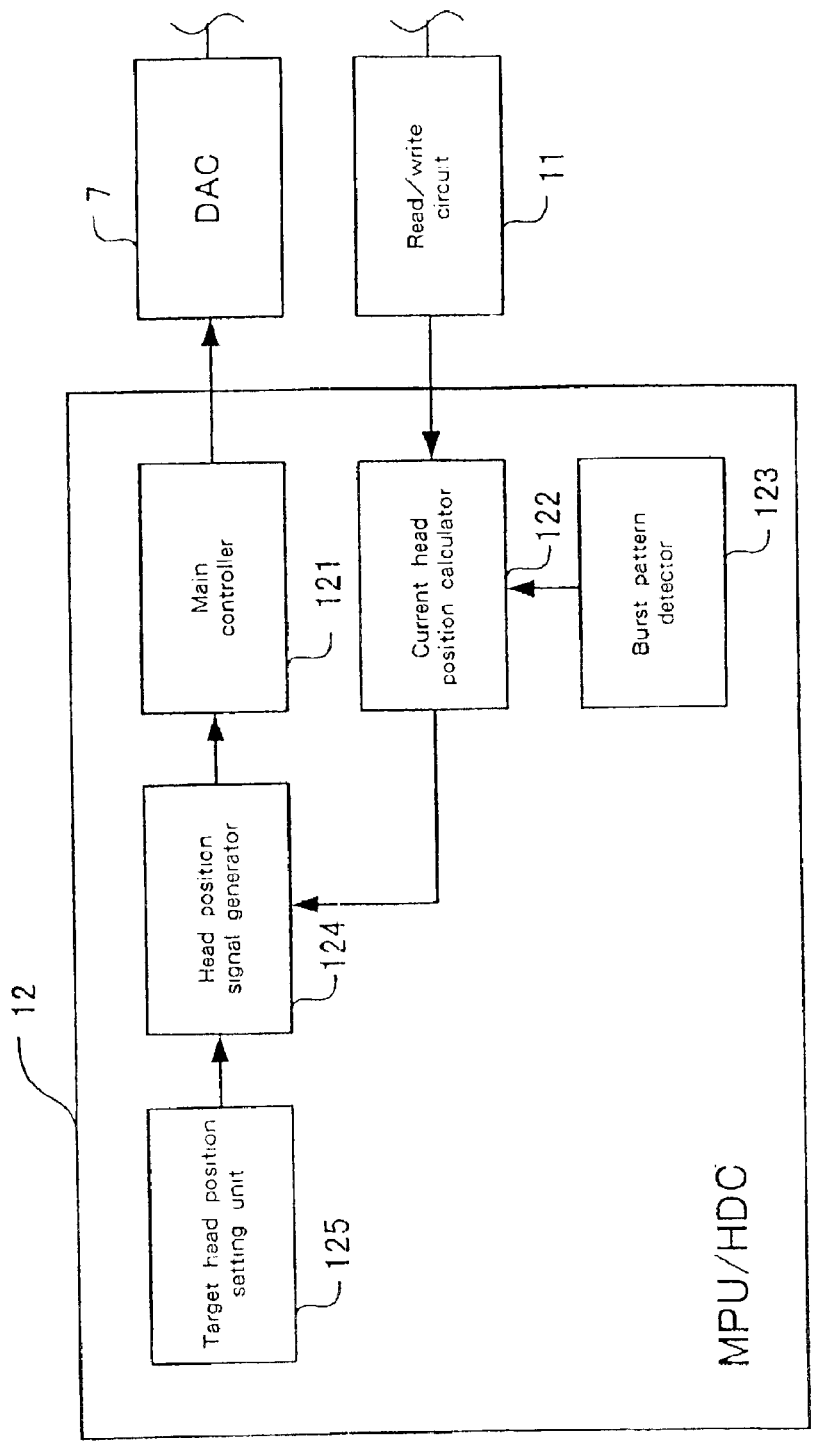
FIG. 4 is a diagram showing the structure of an MPU/HDC according to the embodiment.

An explanation will now be given for the feedback control in the following mode. FIG. 4 is a functional block diagram showing a control system that implements the functions of the MPU/HDC 12 by which, while the magnetic head 4 is reading or writing data, the position of the magnetic head 4 is controlled so as to follow a predetermined position corresponding to each data track 34 (in order to perform the following operation).

A signal is output by the read/write circuit 11 to a current head position calculator 122 and a burst pattern detector 123. Based on the received signal, the burst pattern detector 123 determines whether the magnetic head 4 corresponds to the burst pattern storage area 30B, and outputs the determination results to the current head position calculator 122. When the burst pattern detector 123 determines that the magnetic head 4 corresponds to the burst pattern storage area 30B, the current head position calculator 122 fetches a signal output by the read/write circuit 11, and employs this signal to calculate and output the position (the current position of the magnetic head 4) to which the magnetic head 4 corresponds along the diameter of the magnetic disk 2. Therefore, the current head position is periodically output by the current head position calculator 122.

A target head position setting unit 125 sets and outputs the target position for the magnetic head 4 in the direction of the diameter of the magnetic disk 2. When the center position of a gap corresponding to the read element of the magnetic head 4 is longitudinally shifted from the center of a gap corresponding to the write element, the target head position setting unit 125 sets and outputs a different value for the target position for the magnetic head 4 for the reading of data from and the writing of data to the data track 34 (e.g., for the data reading, a value whereat the center of the gap of the read element matches the center of the data track 34, or for the data writing, a value whereat the center of the gap of the write element matches the center of the data track 34).

The current head position output by the current head position calculator 122, and the target head position output by the target head position setting unit 125 are transmitted to a head position signal generator 124. The head position signal generator 124 compares the current head position with the target head position, and outputs a head position signal y(n) that represents the size and direction of the deviation of the current head position from the target head position (to which side the current head position is shifted from the target head position, either the inner side or the outer side). The head position signal y(n) stands for a PES.

Figure 7:
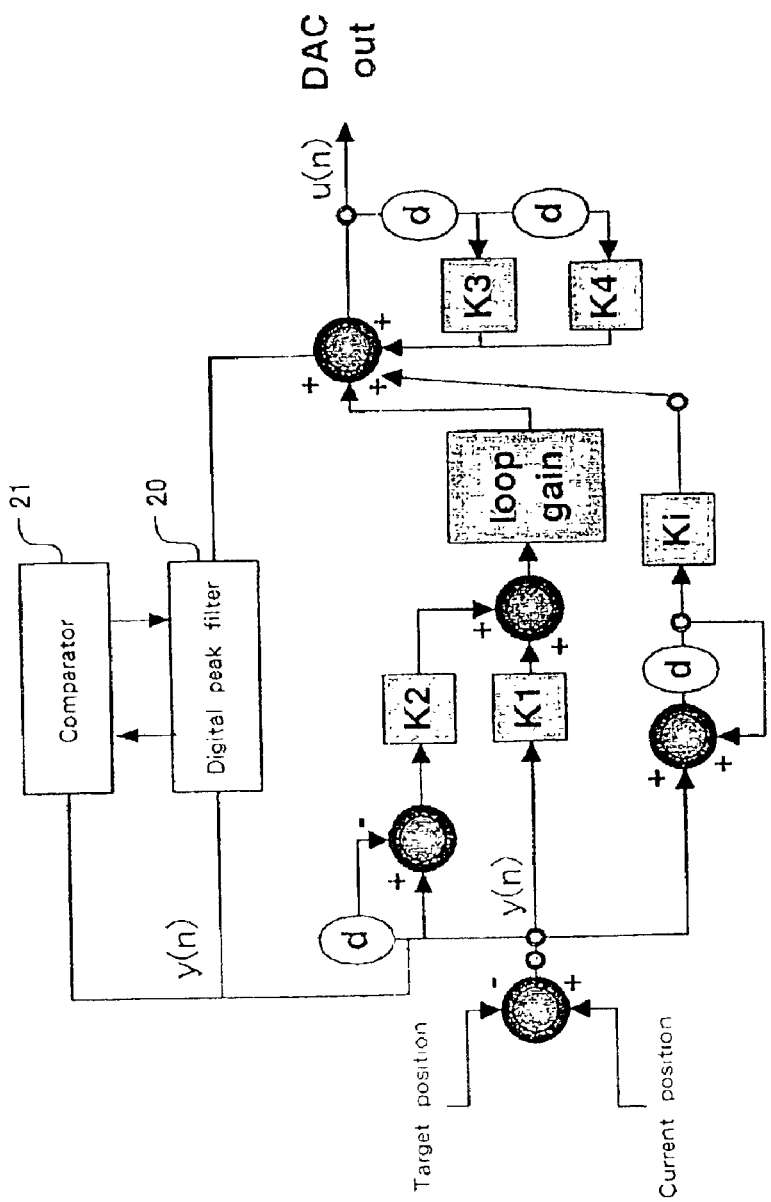
FIG. 7 is a diagram showing the structure by which feedback control is provided for a following mode.

The head position signal y(n) is transmitted to a main controller 121. FIG. 7 is a conceptual block diagram showing a process performed by the main controller 121 based on the relationship between the input and output effected through this process. As is shown in FIG. 7, the following mode is a control process for adding an integrator to the settling mode. In FIG. 7, u(n) is the DAC out that is output to the DAC 7 in the following mode. In the following mode, as is shown in FIG. 7, a digital peak filter 20 is provided. The output Fout of the digital peak filer 20 can be represented by the equation below.

$$Fout=(KaZ^2-KbZ)/(Z^2-2\cos(\omega\cdot T)Z+1),$$

wherein Z denotes a signal output immediately before by the digital peak filter 20, and is called a state variable. Ka and Kb denote gains, and $\omega$ and T denote an angular frequency and a set frequency. The output Fout is output by being added to the DAC out, which is the control signal in the feedback control.

For the feedback control in the following mode, a comparator 21 is provided. The comparator 21 receives a signal output immediately before by the digital peak filter 20, and also a deviation signal PES (y(n)), and compares the phases of these two signals. When the phase of the PES matches the phase of the output signal of the digital peak filter 20, the comparator 21 instructs the digital peak filter 20 to slow down the set frequency T. And when the phase of the PES is shifted 180° from the phase of the output signal of the digital peak filter 20, the comparator 21 instructs the digital peak filter 20 to accelerate the set frequency T.

The processing in the following mode performed by the thus arranged hard disk drive 1 will now be described while referring to the flowchart in FIG. 8.

In the following mode, a check is performed to determine whether the PES exceeds a predetermined value A (step S101 in FIG. 8). This is because the method of the embodiment for following the frequency of the digital peak filter 20 is employed only when the vibration is large.

Figure 8:
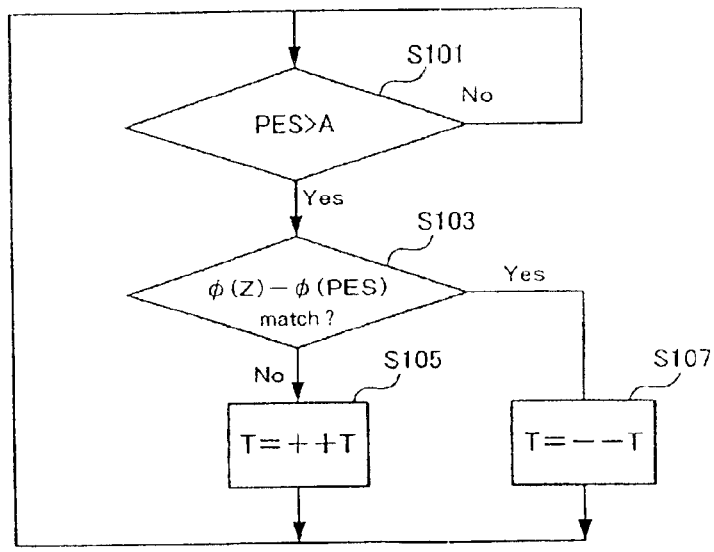
FIG. 8 is a flowchart showing the processing performed to set a frequency for a digital peak filter in a following mode.

When the PES exceeds the predetermined value A, the comparator 21 determines whether the phase of the signal output immediately before by the digital peak filter 20 matches the phase of the PES (step S103 in FIG. 8). When the phase of the preceding signal output by the digital peak filter 20 matches the phase of the PES, the frequency of the preceding signal output by the digital peak filter 20 is faster than the frequency of the PES. Therefore, the frequency T set for the digital peak filter 20 is reduced (step S107 in FIG. 8). When the phase of the preceding signal output by the digital peak filter 20 does not match the phase of the PES, the frequency of the preceding output signal of the digital peak filter 20 is slower than the frequency of the PES. Therefore, the frequency T set for the digital peak filter 20 is increased (step S105 in FIG. 8). When the phase of the preceding signal output by the digital peak filter 20 does not match the phase of the PES, the two phases are shifted 180. By repeating this processing, the PES is adjusted so as to fall to a value equal to or smaller than the predetermined value A.

Figure 9:
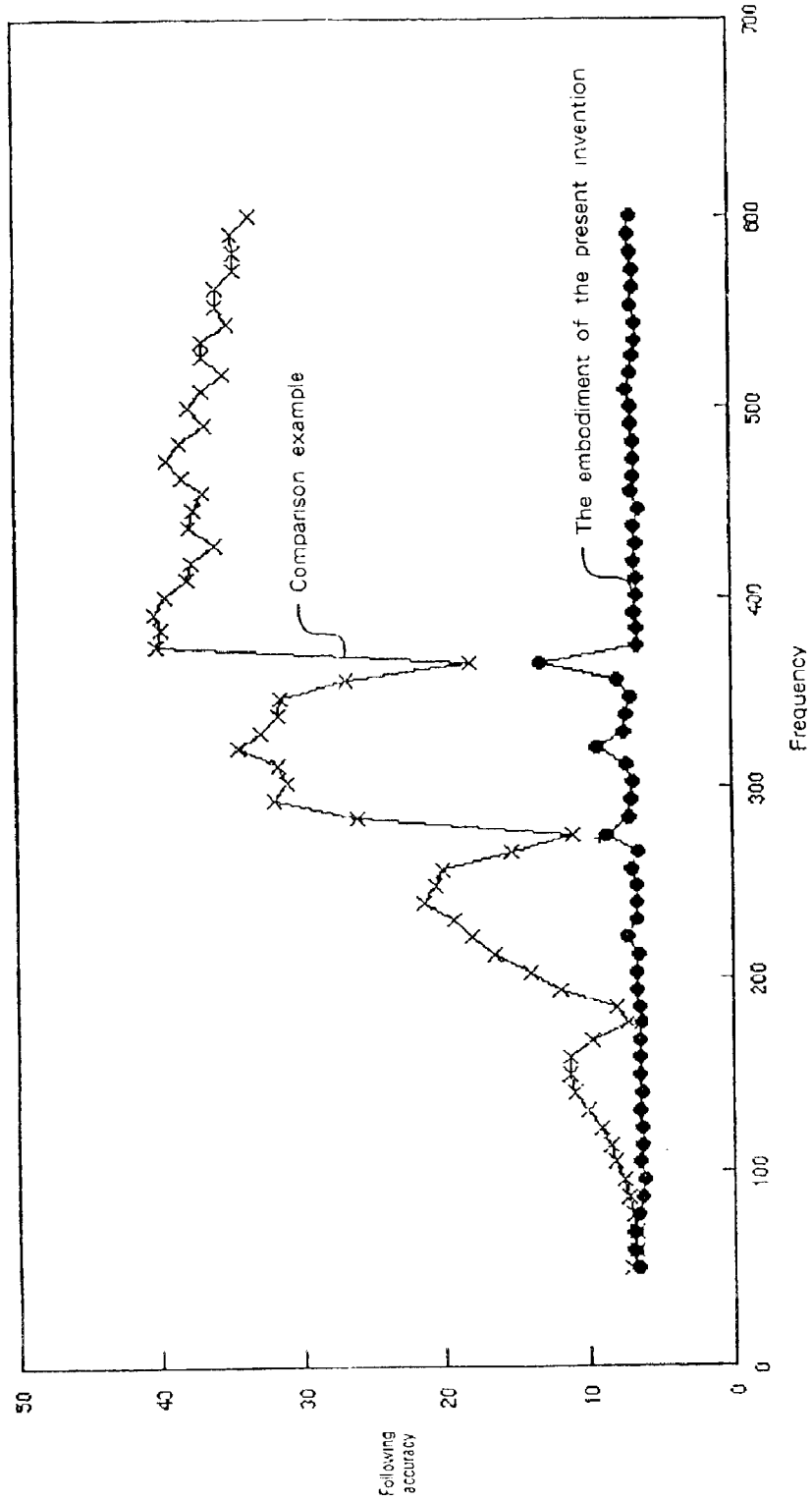
FIG. 9 is a graph showing the relationship between the frequency of a vibration provided for the hard disk drive and the accuracy for following the target position at each frequency.
Figure 10:
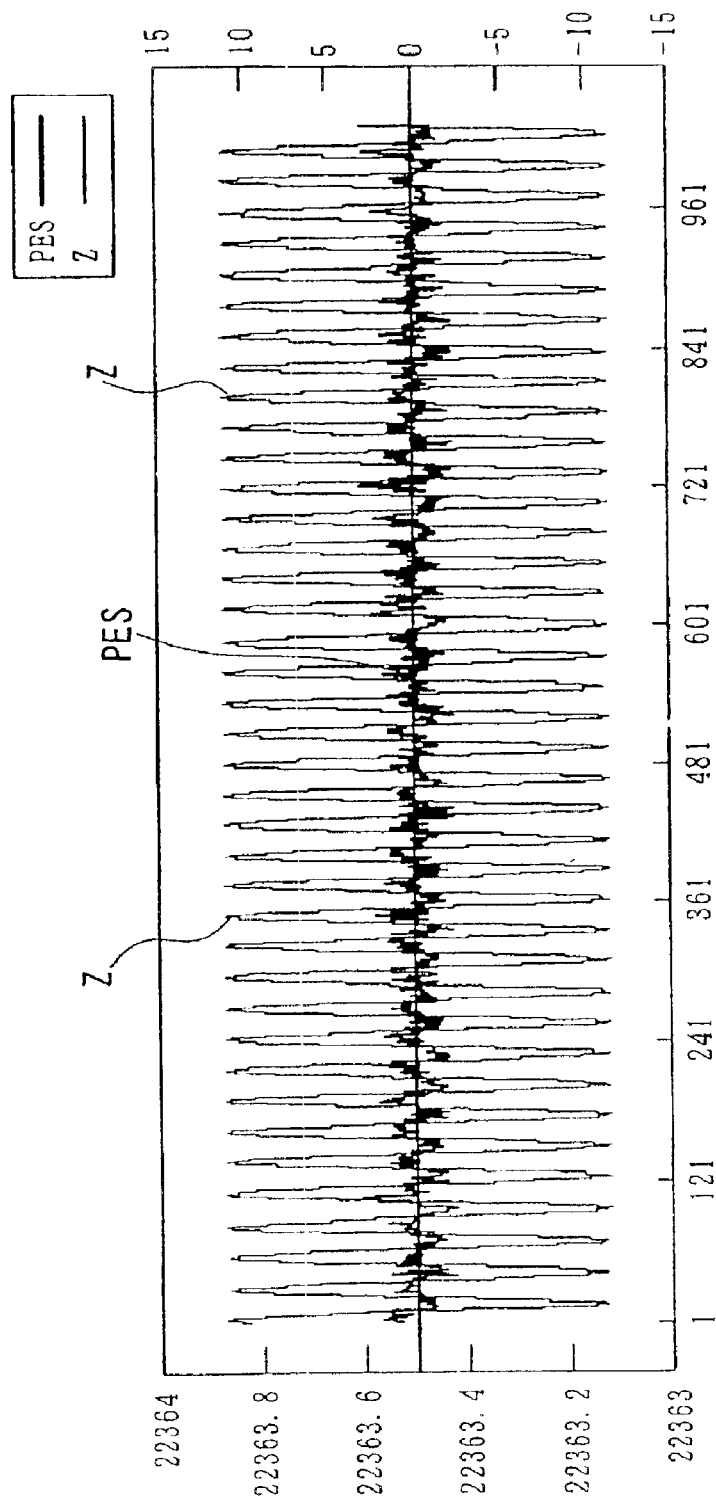
FIG. 10 is a graph showing, for comparison, the waveforms of a state variable Z and a PES in the feedback control.
Figure 11:
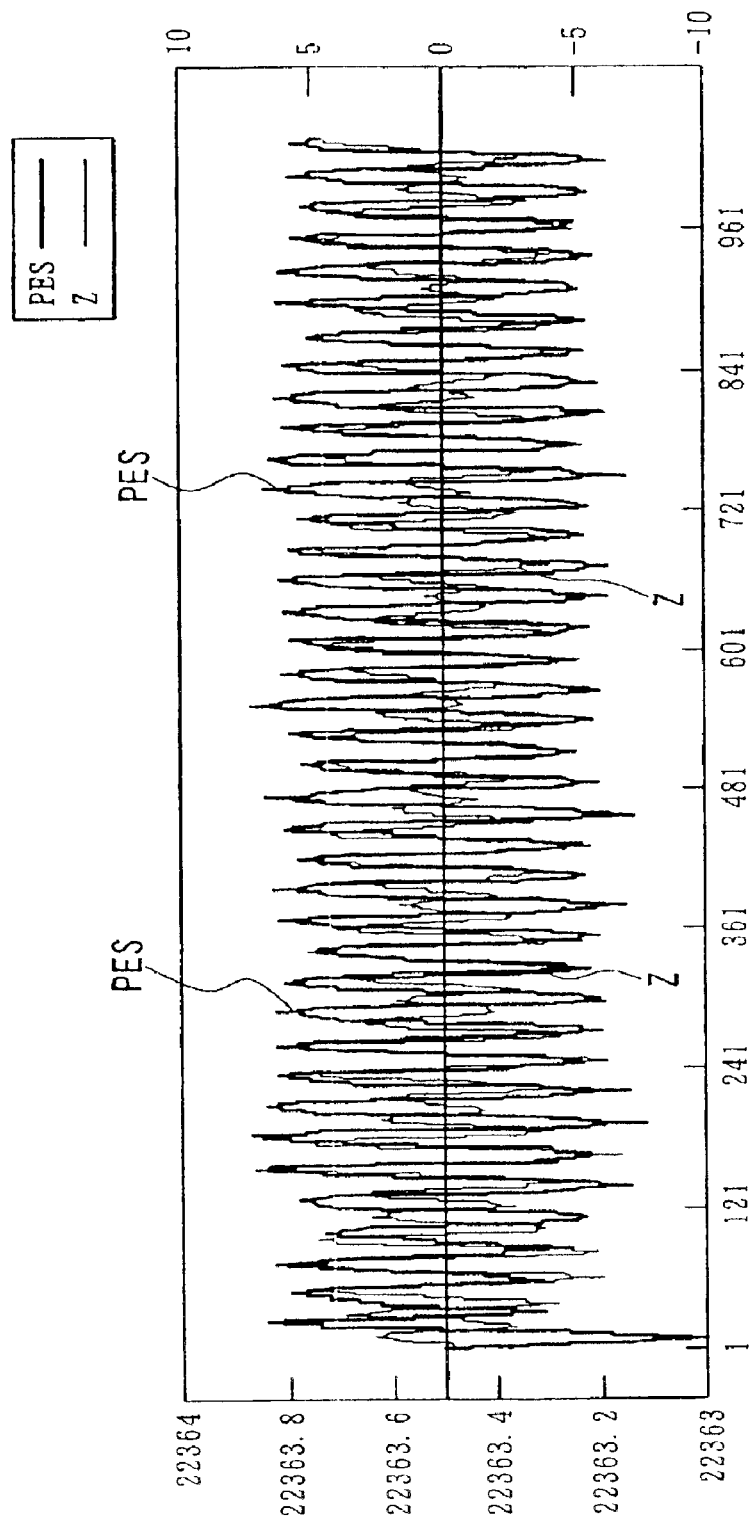
FIG. 11 is a graph showing, for comparison, the waveforms of the state variable Z and the PES in the feedback control.
Figure 12:
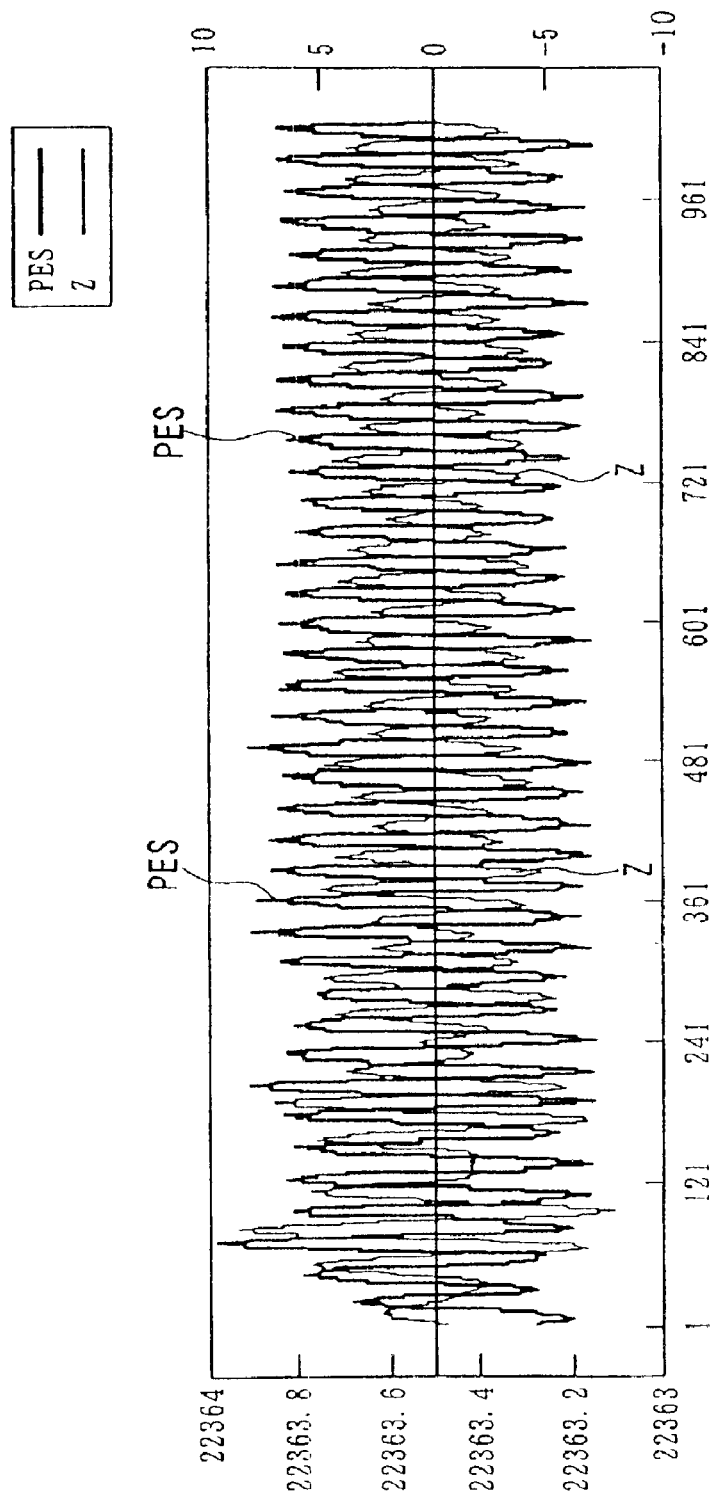
FIG. 12 is a graph showing, for comparison, the waveforms of the state variable Z and the PES in the feedback control.

FIG. 9 is a graph showing the relationship between the frequency (horizontal axis) of a vibration provided for the hard disk drive 1 and the accuracy (vertical axis) for following the target position at each frequency. When the numerical value is small, the following accuracy is favorable. A comparison example is one using the digital peak filter 20 that has four fixed, set frequencies T.

It is apparent from FIG. 9 that, according to the embodiment, the vibration attenuation function is effective across the entire frequency range that was measured, and favorable following accuracy is provided. On the other hand, in the comparison example the following accuracy is improved for each set frequency T, but is apparently deteriorated in the other frequency bands.

As is described above, since the hard disk drive 1 of the embodiment permits the frequency T set for the digital peak filter 20 to follow the PES, the vibration attenuation function can be obtained for a vibration across a wide frequency range. Especially in this embodiment, since the phase of a preceding signal output by the digital peak filter 20 is compared with the phase of the PES, the set frequency T of the digital peak filter 20 can be changed. This is a simpler method than the one whereby the detection of the frequency is performed by analyzing the PES. In this embodiment, the hard disk drive 1 has been employed as the data storage device; however, the present invention can be also applied for another data storage device. Further, the positioning apparatus or the positioning method of the embodiment can also be applied for an application other than the data storage device.

As will be appreciated from the above description, the present invention advantageously allow the head to be controlled so that in the following mode it can follow the data track.

What is claimed is:

1. A data storage device comprising:
   a storage medium for storing user data and servo data;
   a head for writing and reading said user data at a predetermined access location on said storage medium, and for reading said servo data;
   signal output means for employing said servo data read by said head to output a position shift signal that represents the distance the position of said head is shifted;
   a filter for receiving said position shift signal, and for obtaining an effective gain relative to a predetermined frequency that has been set;
   phase comparison means for comparing the phase of said position shift signal with the phase of a signal output by said filter;
   frequency setting means for changing said predetermined frequency based on the comparison results obtained by said phase comparison means;
   control means for, based on said position shift signal and said signal output by said filter, generating a control signal in order to position said head at said access location, and for outputting said control signal; and
   a motor for driving said head based on said control signal.

2. The data storage device according to claim 1, wherein said frequency setting means changes said predetermined frequency so that said predetermined frequency can follow said frequency of said position shift signal.

3. The data storage device according to claim 1, wherein, when the phase of said position shift signal is not substantially shifted away from the phase of said signal output by said filter, said frequency setting means reduces said predetermined frequency.

4. The data storage device according to claim 1, wherein, when the phase of said position shift signal is shifted 180° away from the phase of said signal output by said filter, said frequency setting means increases said predetermined frequency.

5. A data storage device comprising:
   a disk medium on which multiple tracks are formed;
   a head for performing a seek for said disk medium and for accessing a target track;
   an actuator for receiving a control current, and for moving and positioning said head above said target track; and a controller for outputting said control current under feedback control, wherein said controller outputs said control current to which a signal is added that has a vibration attenuation function at a predetermined set frequency, and wherein said controller sets said predetermined frequency based on a phase relationship between a signal indicating a deviation of said head relative to said target track, and a preceding signal that has a vibration attenuation function.

6. The data storage device according to claim 5, wherein, when there is a predetermined deviation of said head relative to said target track, said controller sets said predetermined frequency based on said phase relationship between said signal indicating said deviation of said head relative to said target track and said preceding signal that has said vibration attenuation function.

7. The data storage device according to claim 5, wherein said controller sets said predetermined frequency based on said phase relationship, so that said predetermined frequency matches or is set close to the frequency of said signal indicating said deviation of said head relative to said target track.

8. A positioning apparatus for employing an actuator to locate a positioning object at a target position on an access object comprising:

signal output means for outputting a deviation signal that indicates a deviation from said target position by said positioning object;

control means for, based on a deviation signal output by said signal output means, outputting to said actuator a control signal that ensures said positioning object follows said target position, and for controlling the position of said positioning object; and a digital peak filter for setting a predetermined frequency, or a frequency band including said predetermined frequency, and for filtering said received deviation signal and outputting a signal indicating the filtering results, wherein said control means outputs said control signal with said signal output by said digital peak filter, and wherein said digital peak filter increases or decreases said predetermined frequency of a preceding output signal in accordance with a phase difference between said preceding output signal and said deviation signal, and employs the obtained predetermined frequency to perform filtering.

9. The positioning apparatus according to claim 8, wherein, when said phase difference is substantially 0, said digital peak filter decreases said predetermined frequency of said preceding output signal; and wherein, when said phase difference is substantially 180°, said digital peak filter increases said predetermined frequency of said output signal and employs a newly obtained predetermined frequency to perform filtering.

10. The positioning apparatus according to claim 8, wherein said access object is a data storage medium on which multiple tracks for the storage of user data are concentrically formed; and wherein said positioning object is a head for reading user data from said track or for writing user data to said track.

11. The positioning apparatus according to claim 8, wherein, when a burst pattern is formed on said data storage medium, said signal output means outputs said deviation signal based on said burst pattern read by said head.

12. A positioning method, for employing a deviation signal that indicates the deviation of a positioning object relative to a target position on a rotary disk to ensure said positioning object follows said target position, comprising the steps of:

comparing the phase of said deviation signal, which indicates said deviation of said positioning object from said target position, and the phase of a filtering signal, which is obtained by filtering said deviation signal at a predetermined frequency or in a frequency band including said predetermined frequency;

employing the obtained relationship between said phase of said deviation signal and said phase of said filtering signal to increase or decrease said preceding predetermined frequency; and adding a filtering signal at the resultant frequency to a control signal that ensures said positioning object follows said target position.

13. The positioning method according to claim 12, wherein said relationship is defined by matching or not matching said phases of said deviation signal and said filtering signal.

14. The positioning method according to claim 12, wherein said filtering is performed by a digital peak filter.

15. The positioning method according to claim 12, wherein said disk is a magnetic disk for a hard disk drive; and wherein said positioning object corresponds to a magnetic head for reading data from tracks that are concentrically formed on said magnetic disk.

* * * * *